Feb. 26, 1963    W. W. CROW    3,078,866
AUTOMATIC VALVE SYSTEM FOR CONTROLLING FLUID FLOW
Filed July 28, 1961    2 Sheets-Sheet 1

INVENTOR.
WILLIAM W. CROW,
BY
McMorrow, Berman & Davidson
ATTORNEYS.

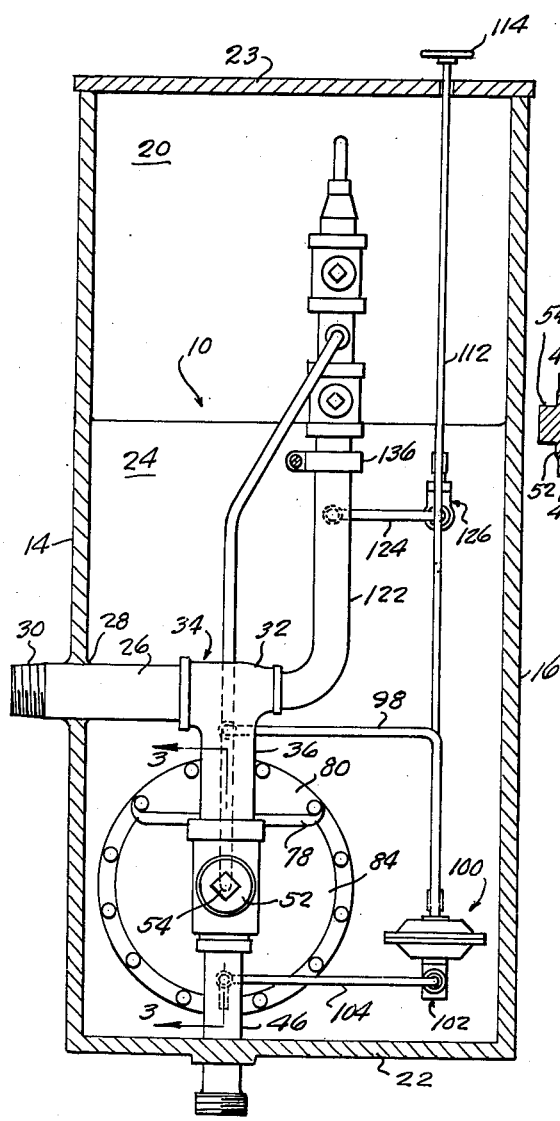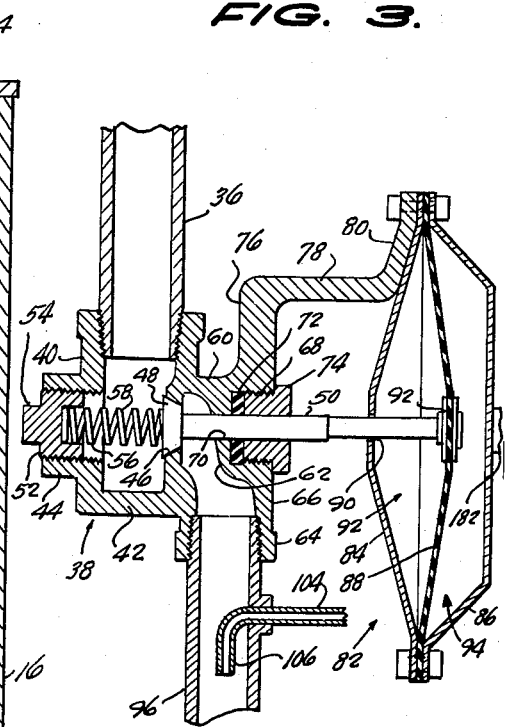

United States Patent Office 3,078,866
Patented Feb. 26, 1963

3,078,866
AUTOMATIC VALVE SYSTEM FOR CONTROLLING FLUID FLOW
William W. Crow, 5828 Fostoria, Bell Gardens, Calif.
Filed July 28, 1961, Ser. No. 127,686
5 Claims. (Cl. 137—391)

This invention relates to fluid flow control means and, more specifically, this invention pertains to a valve system for controlling the flow of fluids through conduits connected at one end with a source of fluid under pressure, and at its other end with fluid-discharge devices.

One of the primary objects of this invention is to provide an automatically-operable valve system for controlling the supply of water to a sprinkler system located in the lawn of a private home, a park, or other similar area.

A further object of this invention is to provide an automatically-operable valve system for lawn sprinklers, the valve system including means for effecting the sequential operation thereof.

Another object of this invention is to provide an automatically-operable valve system which is adapted for sequential operation to open and close, together with means for varying the timing interval between the opening and closing of said automatically-operable valve system.

This invention contemplates, as a still further object thereof, the provision of an automatically-operable valve system of the type generally referred to supra, wherein the system is non-complex in construction and assembly, relatively inexpensive to manufacture and maintain, and which is durable in use.

Other and further objects and advantages of the instant invention will become more evident from a consideration of the following specification when read in conjunction with the annexed drawings, in which:

FIGURE 2 is an end elevational view of the automatically-operable valve system, FIGURE 2 being taken substantially on the vertical plane of line 2—2 of FIGURE 1, looking in the direction of the arrows;

FIGURE 3 is an enlarged detail cross-sectional view, FIGURE 3 being taken substantially on the vertical plane of line 3—3 of FIGURE 2, looking in the direction of the arrows.

Figure 1:
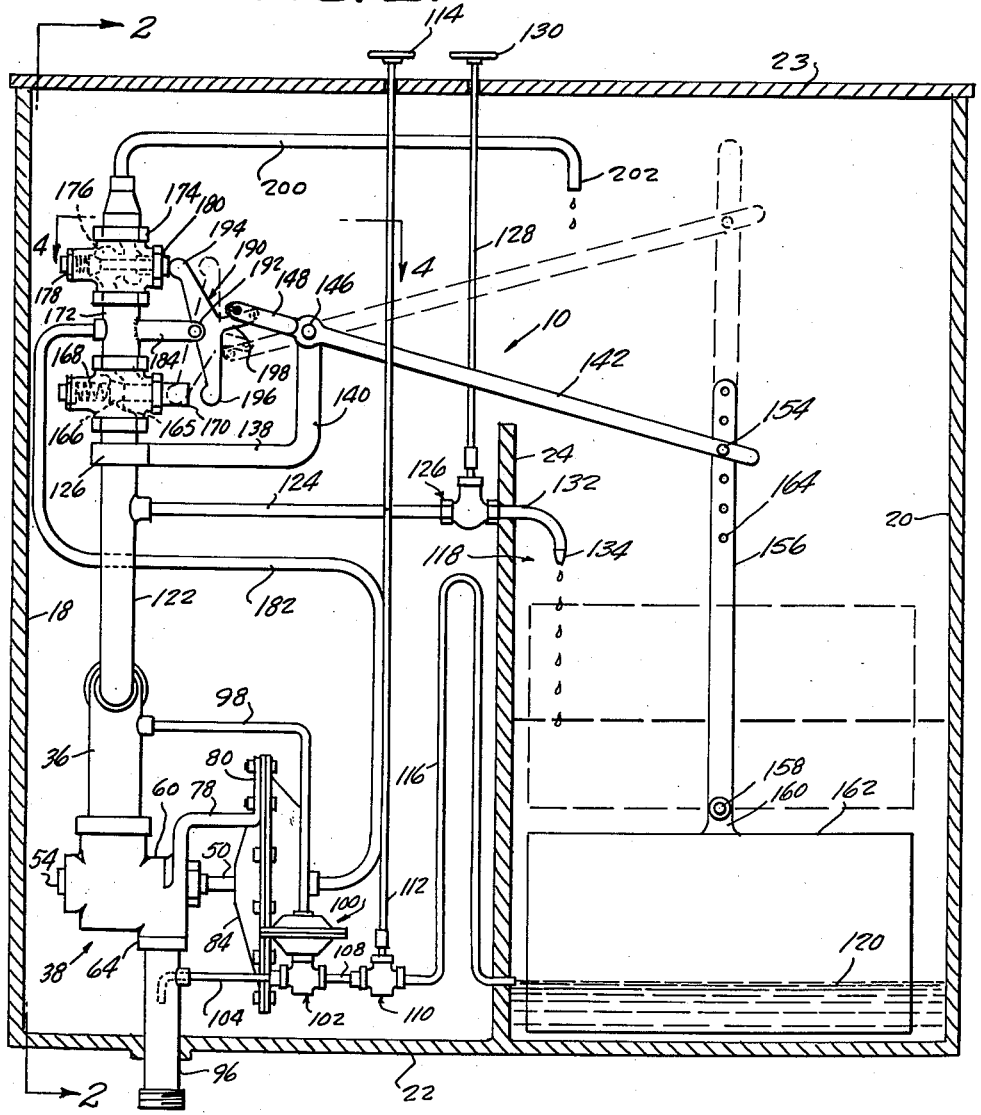
FIGURE 1 is a side elevational view of the automatically-operable valve system constructed in accordance with this invention.

Referring now more specifically to the drawings, numeral 10 designates, in general, an automatically-operable valve system for controlling fluid flow and constructed in accordance with the teachings of this invention. The system is seen to include an elongated substantially hollow rectangular watertight housing 12 having a pair of laterlly-spaced substantially parallel upright side walls 14, 16 (see FIGURE 2), a pair of longitudinally-spaced upright substantially rectangular and parallel end walls 18, 20 (see FIGURE 1), across the lower ends of which extends a bottom wall 22, also of rectangular configuration. An elongated substantially rectangular top wall 23 extends across the upper ends of the aforementioned side and end walls. As is seen in FIGURES 1 and 2, a substantially rectangular divider plate 24 extends between the side walls 14, 16 and is integral with the bottom wall 22. The housing 12 may be formed of any suitable material, but in this instance, it is preferred to form the same of metal to facilitate the watertight construction thereof.

As is seen in FIGURE 2 of the drawings, a water inlet pipe 26 extends through the side wall 14 and is fixedly secured thereto, as by welding 28. The outer or exterior end of the pipe 26 is threaded, as at 30, to provide a connection thereof with a source of water under pressure. The inner end of the pipe 26 connects with one end of the crosshead 32 of a T-coupler 34 (see FIGURE 2). The T-coupler 34 is provided with a downwardly-extending stem 36 exteriorly threaded at its lower end to serve a purpose to be described.

Reference numeral 38 denotes, in general, a valve casing. The valve casing 38 comprises a substantially hollow cylindrical main body portion 40 having an internally-threaded open upper end which is adapted for connection with the lower threaded end of the stem 36. The opposed end of the main body portion 40 is closed as by the end wall 42. Intermediate the opposed upper and closed lower ends of the main body portion 40 is formed a laterally-projecting, internally-threaded hollow cylindrical boss 44. Oppositely disposed with respect to the boss 44 and in confronting relationship with respect thereto is a valve seat 46 for a valve 48 having a substantially cylindrical valve stem 50 projecting laterally away therefrom. As is seen in FIGURE 3 of the drawings, the valve seat 46 is formed in the main body portion 40 and extends transversely therethrough.

Reference numeral 52 indicates an externally-threaded plug adapted for threaded engagement within the internally-threaded boss 44. The plug 52 is provided with an axially-extending wrench head 54 to facilitate the insertion and removal of the plug 52 from the boss 44. The plug 52 is provided with a recess 56 which extends inwardly from the inner end thereof and forms a cylindrical spring seat for one end of a helicoidal spring under compression, the other end of the spring 56 abutting against the adjacent side of the valve 48. Consequently, the valve 48 is constantly biased for movement toward its seat 46.

The valve casing 38 also includes a laterally-offset hollow casing 60 having a passage 62 extending downwardly, the passage 62 being in open communication with a hollow tubular, internally-threaded cylindrical extension 64. The offset substantially hollow casing 60 is formed with a substantially flat side 66 which lies in a plane perpendicular to the longitudinally-extending axis of the valve stem 50. The offset hollow casing 60 is formed with an internally-threaded opening 68 which extends inwardly from the flat side thereof in coaxial relationship relative to the valve stem 50, and coaxially aligned with the internally-threaded opening 68 is a coaxial smooth bore or opening 70. The valve stem 50, reference being made to FIGURE 3 of the drawings, is seen to extend through the bore 70 and the internally-threaded opening 68 and projects laterally beyond the flat side 66 of the offset casing 60. Surrounding the valve stem 50 and disposed within the internally-threaded opening 68 is a packing ring 72 held against displacement by means of the valve stem guide plug 74 which is externally threaded for threaded engagement within the internally-threaded opening 68. The offset hollow casing 60 also includes an upwardly-extending flange 76 which is integrally formed with a laterally-projecting shoulder 78 which terminates, at its outer end, in an upwardly-extending bracket 80.

From the bracket 80 depends a pressure-responsive device 82 which is conventional in this art, the pressure-responsive device 82 including a pair of oppositely-disposed substantially concavo-convex side walls 84, 86 connected together with the concave sides thereof disposed in confronting relationship. The side walls 84, 86 are substantially circular in side elevation and have clamped between their respective adjacent circumferential marginal edges, the marginal edge of a flexible diaphragm 88. As is seen in FIGURE 3, the valve stem 50 is of such length as to extend through an aperture 90 formed in the side wall 84 for connection at 92, by conventional means, with the diaphragm 88.

The diaphragm 88 divides the pressure-responsive device 82 into two chambers 92, 94, respectively, and it is thus evident that the presence of pressure in the chamber 94 will cause the diaphragm 88 to move laterally to the left, as viewed in FIGURE 3, thereby causing the valve 48 to become unseated from its valve seat 46 against the tension of the spring 58. This, of course, places the interior of the valve casing 38 into communication with the passage 62. Release of pressure in the chamber 94 will permit the valve 48 to again seat against its valve seat 48 under the force of the spring 58. It will be understood, of course, that the aperture 90 formed in the side wall 84 is sufficiently large as to vent the chamber 92 to the atmosphere.

Reference numeral 96 denotes an elongated, substantially hollow cylindrical water-discharge conduit having an end thereof threaded into the hollow tubular cylindrical extension 64 of the offset casing 60. As is seen in FIGURES 1 and 2, the conduit 96 extends transversely through and below the bottom wall 22 in order to provide a lower end for connection with the sprinkling system (not shown).

Reference numeral 98 designates an inverted L-shaped pipe having one of its ends in open communication with the stem 36, and the other of its ends connected with a pressure-responsive device of the type illustrated in FIGURE 3 by reference numeral 82. The pressure-responsive device 100 is connected, in turn, with the conventional normally-closed valve 102. The discharge side of the valve 102 connects with one end of a pipe 104 which extends transversely through the water-discharge conduit 96 and terminates in a downwardly-extending nozzle 106 (see FIGURE 3). The inlet side of the valve 102 is connected with one end of a pipe 108 having its other end connected with the discharge side of a manually-operable, conventional valve 110. The valve 110, in this instance, is controlled by means of an elongated valve-operating rod 112 which extends vertically through the top wall 23, and the upper end thereof has fixedly secured thereto a manually-operable handle 114. The inlet side of the valve 110 is connected to one end of an inverted substantially U-shaped pipe 116 and, as is seen in FIGURE 1 of the drawings, one of the arms of the inverted U-shaped pipe 116 is bent laterally to extend through the divider wall 24 and is in open communication with the compartment 118 defined by the divider wall 24, the opposed end wall 20 and those portions of the side walls 14, 16 which extend therebetween. The compartment 118 is designed to retain a liquid, such as, for example, water, the liquid level of which will vary under circumstances to be described below.

The other end of the crosshead 32 is connected to one end of a vertically-extending pipe 122 which is tapped and connected with one end of a branch pipe 124. The other end of the branch pipe 124 is connected to the inlet side of a conventional valve 126 manually controlled by the control rod 128 which extends vertically therefrom and projects through the top wall 23. For convenience, a manually-operable handle 130 is connected to the upper end of the control rod 128. The discharge side of the valve 126 has connected thereto a pipe 132 that extends through the divider wall 24 into the compartment 118 and terminates in a downwardly-projecting nozzle 134.

A clamp 136 is fixedly secured to the pipe 122 adjacent the upper end thereof. The clamp 136 is integral with a laterally-extending support member 138 from the outer end of which upwardly projects an arm 140 (see FIGURE 1). The support member 138 and arm 140 project away from the pipe 122 in the direction of the divider wall 24. An elongated lever 142 terminates at one of its ends in a clevis 144 having outwardly-diverging substantially arcuate arms 146, 148. A helicoidal spring 150 has its ends fixedly secured to the outer ends of the arms 146, 148, the spring 150 being designed to function in a manner to be described below.

Figure 4:
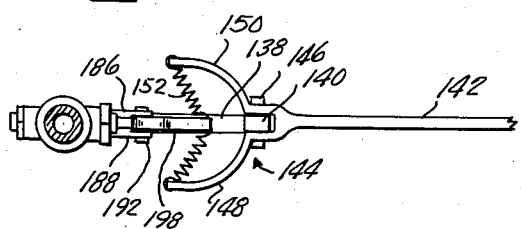
FIGURE 4 is an enlarged fragmentary top plan view, FIGURE 4 being taken substantially on the horizontal plane of line 4—4 of FIGURE 1, looking in the direction of the arrows.

The clevis 144 (see FIGURES 1 and 4) is pivotally connected on pivot pin 146 to the arm 140.

The other end of the lever 142 is adjustably connected by pivot pin 154 to one end of a lever 156, the other end of the lever 156 being pivotally connected at 158 to the upper end of a boss 160 fixedly secured to the upper end of a float 162 disposed within the compartment 118. The lever 156, adjacent its upper end, is provided with a plurality of transversely-extending axially-spaced apertures 164 to selectively receive the pivot pin 154 therein. As is seen in FIGURE 1, the lever 142 extends across the upper end of the divider wall 24.

Mounted on the upper end of the pipe 122 is a conventional valve casing 165 which houses a valve 166 spring-biased at 168 toward its closed position. The valve casing 165 receives therethrough a valve-actuating rod 170. The discharge side of the valve casing 165 connects, through a short length of pipe 172 with the inlet side of a second similarly constructed valve casing 174. The valve casing 174 has disposed therein a valve 176 spring-biased at 178 for movement toward its closed position. Connected to the valve 176 and extending transversely through the valve casing 174 is a valve-actuating stem 180. The valve-actuating stems 170 and 180 are, as is seen in FIGURE 1, disposed in vertically-spaced and substantially parallel relationship, one with respect to the other.

One end of a conduit 182 is connected with the pipe 172 and the other end of the conduit 182 connects through the side wall 86 of the pressure-responsive device 82 and is in open communication with the chamber 94. The pipe 172 has fixedly secured thereto a radially-extending support bar 184 which, at its outer end, is bifurcated to form the spaced-apart and substantially-parallel arms 186, 188. A bell-crank lever 190 is pivotally connected on pivot pin 192 (see FIGURES 1 and 4) between the arms 186, 188. The bell-crank lever 190 has a pair of ends 194, 196, respectively, which are disposed in confronting relation relative to the valve-actuating stems 170, 180. The other end 198 of the bell-crank lever 190 projects inwardly between the arms 148, 150 of the clevis 144. This end of the bell-crank lever 190 engages against the helicoidal spring 192 substantially centrally thereof and places the spring 192 under tension.

The discharge side of the valve casing 174 is connected to a laterally-extending pipe 200 which projects beyond and over the divider wall 24 and terminates, at its outer end, in a downwardly-turned portion 202 disposed over the compartment 118.

Having described and illustrated this invention in considerable detail, the operation of the valve system will now be set forth.

Let it be assumed that the water inlet pipe 26 has been connected with a source of water under pressure, that the valve 48 is seated in its valve seat 46, that the valves 110, 126 and 166 are in their closed positions, and that the valve 176 is in its open position, as shown in FIGURE 1. Water will now enter the T-coupler 34, filling the valve casing 38, but the water cannot pass further in a downward direction since the valve 48 is closed. The T-coupler 34 is, of course, filled with water which rises in the pipe 122 until it reaches the closed valve 166. Water under pressure will also pass through the pipe 98 to the pressure-responsive device 100 controlling the valve 102 and moves the valve 102 to its closed position.

The handle 130 of the valve control rod 128 is now operated to open the valve 126 to permit water to pass from the pipes 122, 124 through the valve 126 and the pipe 132 together with its nozzle 134 from whence it is discharged into the compartment 118. Preferably, the handle 114 is also actuated to turn its associated valve-operating rod 112 to open the valve 110.

As water begins to accumulate in the compartment 118, the float 162 begins to move upwardly to eventually assume its dotted-line position shown in FIGURE 1. As this movement occurs the lever 156 also moves to its dotted-line position, causing the lever 142 to pivot in a counterclockwise direction about the pivot pin 148 to assume its dotted-line position.

As the lever 142 moves in a counterclockwise direction the clevis 144, together with the spring 152, moves in the same direction and, as the spring 152 passes below the center of the end 198 of the bell-crank lever 190, the bell-crank lever 190 is pivoted in a clockwise direction, whereby the bell-crank lever 196 is caused to engage against and push the valve-actuating stem 170 inwardly of its casing 165 to open the valve 166 against the tension of the spring 168. Simultaneously therewith, the bell-crank lever end 194 is moved away from the valve-actuating stem 180 of the valve casing 174, whereby the valve 176 closes under the force of the spring 178.

When this condition obtains, water under pressure passes into the pipe section 172 and is led through the conduit 182 to the compartment 94 of the pressure-responsive device 82 and acts against the diaphragm 88 thereof. This pressure forces the diaphragm 88 to move laterally to the left, as viewed in FIGURE 3, causing the valve stem 50 to move in the same direction, whereby the valve 48 is removed from its valve seat 46 against the tension of the spring 58. Water now passes from the stem 36 into the valve casing 38 which is now in open communication with the passage 66, the water being discharged through the extension 64 into the pipe 96, the latter being connected, of course, with the sprinkler system mentioned above.

When the valves 48 and 166 are opened, pressure in the conduit 182 is reduced and the valve 102 opens. The water passing rapidly through the water-discharge conduit 96 produces aspiration at the nozzle end 106 of the pipe 104 to produce a siphoning effect of the water 120 through the inverted U-shaped pipe 116, the valve (now open) 110, pipe 108 and the now open valve 102.

As the liquid level of the water 120 begins to descend, the float 162 will also descend within the compartment 118 causing the lever 142 to pivot from its dotted-line position toward its full-line position as is illustrated in FIGURE 1. Again, as the spring 152 passes through the center of the end 198 of the bell-crank lever 190, the bell-crank lever is snapped and rotated about the pivot pin 192 in a clockwise direction to cause disengagement of the bell-crank lever end 196 from the valve-actuating stem 170 and to re-engage the bell-crank lever end 194 with the valve-actuating stem 180. This moves the valves 166 and 176 to their original positions as shown in FIGURE 1, that is, the valve 166 is now closed, and the valve 176 is open.

Since the water in the conduit 182 is no longer under pressure, the diaphragm 88 will flex back toward its position shown in FIGURE 3, thereby closing the valve 48 and preventing further water from being discharged through the valve casing 38. This movement of the diaphragm 88 will cause a certain displacement of the water disposed in the chamber 94 which will pass upwardly through the conduit 182, the pipe 172 and through the valve casing 174 for discharge through the pipe 200 and its terminal end portion 202 where the same drops into the compartment 118. Simultaneously, pressure is built up on the water in the pipe 96 to cause actuation of the pressure-responsive device to effect a closing of the valve 102. Since water still is carried by the branch pipe 124, and since the valve 126 is still in its open position, water will pass into the compartment 118 from the nozzle 134 and the same will gradually refill and the operating cycle is repeated.

Sequential operation of this valve system is time-controlled in several ways. For example, the time operation for actuating the bell-crank lever 190 may be controlled by selecting an appropriate one of the apertures 164 in which the pivot pin 154 is received. Further, by controlling the rate of flow of water through the valve 126 and nozzle 134 the siphoning effect of the water 120 may be increased or decreased, thus, controlling the rate of rise and fall of the float 162. Again, the siphoning effect may be controlled through adjustment of the valve 110.

Having described and illustrated in detail one embodiment of this invention, it will be understood that the same is offered merely by way of example, and that this invention is to be limited only by the scope of the appended claims.

What is claimed is:

1. An automatically-operable valve system for controlling a source of fluid flow under pressure through a discharge pipe, said system comprising a first pipe connected to said source, a T-coupler having a crosshead and a stem, said first pipe being connected with one end of said crosshead, a second pipe having one of its ends connected to the other end of said crosshead and to the inlet side of a biased closed first valve, a third pipe having one of its ends connected with the outlet side of said first valve and its other end connected to the inlet side of a second valve, a fourth pipe having one of its ends connected to the outlet side of said second valve, the other end of said fourth pipe being open for discharge of fluid therethrough as discharged from said second valve, timing means for actuating said first and second valves to move the same to their respective open positions, resilient means for moving said first and second valves to their respective closed and open positions, a valve casing having a biased closed valve therein, said last-named valve having a valve-actuating stem projecting through said casing, said casing having its inlet side connected with said stem and its outlet side connected with said discharge pipe, a fluid pressure-responsive device, said device including a pair of spaced side walls and a flexible diaphragm interposed therebetween and dividing said device into two compartments, said valve stem having an end thereof extending through one of said side walls and across one of said compartments, means connecting said end of said valve stem with said diaphragm, a fifth pipe having one of its ends connected to said third pipe and its other end connected with the other of said compartments through the other of said side walls whereby the pressure of said fluid in said third pipe is communicated to said diaphragm causing the same to flex and move toward one side wall thereby moving said valve stem to open said last-named valve, resilient means in said casing constantly urging said last-named valve to its closed position upon reduction of fluid pressure in said third and fifth pipes, said first and second valves each having a valve-actuating stem, a support bar projecting away from said third pipe, a bell-crank lever pivotally supported on said support bar, said bell-crank lever having a pair of ends confronting said last-named valve-actuating stems, said ends engaging said stems, alternately, to move said first and second valves to their open positions, respectively, resilient means constantly urging said first and second valves to their respective closed positions, and said timing means comprising a lever, means pivotally supporting said lever on said second pipe intermediate the ends of the former, one of said ends of said lever being pivotally connected with the third end of said bell-crank lever, a fluid compartment, a float disposed in said fluid compartment and movable therein in response to changes of the level of said fluid, and means pivotally connecting the other end of said lever with said float.

2. An automatically-operable valve system as defined in claim 1, wherein said open end of said fourth pipe discharges into said fluid compartment, a branch pipe having one of its ends connected with said second pipe and its other end extending into said fluid compartment to supply fluid therein, and a valve connected in said branch pipe for controlling said supply of fluid to said compartment.

3. An automatically-operable valve system as defined in claim 2, wherein said one end of said lever is bifurcated to form a pair of oppositely-disposed arms, and a resilient element extending between and secured to said arms, said resilient element engaging said third end of said bell-crank lever to cause the same to pivot as said element passes the center of said third end as said lever is pivoted first in one direction and then the other thereby to effect actuation of said first and second valves.

4. An automatically-operable valve system for controlling a source of fluid flow under pressure through a discharge pipe, said system including a first valve connected between said source and said discharge pipe, resilient means constantly urging said first valve for movement toward its closed position, a fluid pressure-responsive device for actuating said first valve to its open position, said fluid pressure-responsive device being operable in response to changes of said fluid pressure of said source, a second valve and a compartment for holding said fluid, a siphon pipe having one of its ends communicating with said compartment adjacent the lower end thereof and its other end connecting with the inlet side of said second valve, a fluid pressure-responsive device for actuating said second valve, a pipe having an end thereof connected with the discharge side of said second valve and its other end terminating within said discharge pipe in an aspirating nozzle, and float control valve operating means for effecting a change in said fluid pressure.

5. An automatically-operable valve system for controlling the flow of fluid under pressure, said system including an elongated substantially hollow rectangular housing comprising a pair of oppositely-disposed laterally-spaced and substantially parallel side walls, a pair of oppositely-disposed longitudinally-spaced and substantially parallel end walls, a bottom wall, a top wall, and a divider wall extending between and secured to said side walls and to said bottom wall, said divider wall being longitudinally spaced from one of said end walls, said divider wall, said one end wall and said side walls embraced therebetween defining a fluid-tight compartment, a first pipe extending transversely through one of said side walls and having an outer end adapted for connection with said fluid under pressure, a T-coupler having a crosshead and a stem depending therefrom, said crosshead having one of its ends connected to the other end of said first pipe, a second pipe having one of its ends connected to the other end of said crosshead, a first normally closed valve having a valve-actuating stem, resilient means constantly biasing said first valve to its closed position, said second pipe having its other end connected to the inlet side of said first valve, a third pipe having one of its ends connected to the outlet side of said first valve and its other end connected with the inlet side of a second normally open valve having a valve-actuating stem, resilient means constantly biasing said second valve to its closed position, a fourth pipe having an end thereof connected with the discharge side of said second valve and its other end positioned to discharge into said compartment, valve-control means for actuating said first and second valves, said valve-control means comprising a support member extending radially from said third pipe adjacent the outlet side of said first valve, a bell-crank lever, means pivotally connecting said bell-crank lever on said support member with a pair of ends of said bell-crank lever disposed in confronting relation relative to said valve-actuating stems, respectively, said bell-crank lever being pivotal in one direction to cause engagement of one of said ends of said bell-crank lever with one of said valve-actuating stems to open its associated valve while pivoting the other of said ends away from the other of said valve-actuating stems to permit its valve to close under the influence of said resilient means, said bell-crank lever being pivotal in the reverse direction to effect a reversal in the position of said valves, support means projecting laterally from said second pipe, a lever pivotally connected intermediate its ends on said support means, said lever being bifurcated at one of its ends, said bifurcated end having a helicoidal spring extending between the arms thereof and engageable with the other end of said bell-crank lever, said lever being pivotal to effect pivotal movement of said bell-crank lever, the other end of said lever extending into said compartment, a float disposed within said compartment and movable therein in response to changes of fluid level in said compartment, a lever having one of its ends pivotally connected to said float and the other end thereof pivotally connected to the other end of said bifurcated lever, said pivotal connection means including means extending axially of said last-named lever to adjustably connect the other end of said bifurcated lever thereto, a branch pipe having one of its ends connected with said second pipe and its other end extending into said compartment, valve means interposed in said branch pipe for controlling the amount of fluid to be supplied to said compartment, a third valve having a valve-actuating stem and means constantly biasing it to its closed position, said third valve having its inlet side connected to said stem of said T-coupler, a fluid-discharge pipe having one of its ends connected to the discharge side of said third valve and its other end extending through said bottom wall, a fluid pressure-responsive device including a flexible diaphragm, means connecting said last-named valve actuator with said diaphragm to cause said actuator to move said third valve to its open position in the presence of fluid under pressure in said device, a fifth pipe connecting said third pipe with said device, a siphon pipe having an end thereof communicating with said compartment adjacent the lower end thereof and its other end terminating in an aspirating nozzle in said last-named discharge pipe, a normally closed pressure-responsive device connected in said siphon pipe, and a sixth pipe connected with said second pipe and said last-named valve.

References Cited in the file of this patent

UNITED STATES PATENTS

| | | |
|---|---|---|
| 2,803,263 | Kenney | Aug. 20, 1957 |
| 2,965,117 | Gallacher | Dec. 20, 1960 |